(12) United States Patent
Wu

(10) Patent No.: US 9,366,098 B2
(45) Date of Patent: Jun. 14, 2016

(54) ENGINEERING PLASTIC / INORGANIC FIBER BLENDS AS LOST CIRCULATION MATERIALS

(71) Applicant: Qinglin Wu, Baton Rouge, LA (US)

(72) Inventor: Qinglin Wu, Baton Rouge, LA (US)

(73) Assignee: Board of Supervisors of Louisiana State University And Agricultural and Mechanical College, Baton Rouge, LA (US)

( * ) Notice: Subject to any disclaimer, the term of this patent is extended or adjusted under 35 U.S.C. 154(b) by 37 days.

(21) Appl. No.: 14/375,835

(22) PCT Filed: Jan. 24, 2013

(86) PCT No.: PCT/US2013/022847
§ 371 (c)(1),
(2) Date: Jul. 31, 2014

(87) PCT Pub. No.: WO2013/116072
PCT Pub. Date: Aug. 8, 2013

(65) Prior Publication Data
US 2014/0374110 A1 Dec. 25, 2014

Related U.S. Application Data

(60) Provisional application No. 61/593,999, filed on Feb. 2, 2012.

(51) Int. Cl.
*E21B 21/00* (2006.01)
*E21B 33/138* (2006.01)
*C09K 8/487* (2006.01)
*C09K 8/504* (2006.01)
*C09K 8/508* (2006.01)

(52) U.S. Cl.
CPC ............... *E21B 21/00* (2013.01); *C09K 8/487* (2013.01); *C09K 8/508* (2013.01); *C09K 8/5045* (2013.01); *C09K 2208/08* (2013.01)

(58) Field of Classification Search
CPC ..... E21B 43/243; E21B 21/003; E21B 43/24; E21B 33/13; E21B 43/281; E21B 33/138; E21B 21/06; E21B 33/00; E21B 21/08; C09K 8/03; C09K 8/487
See application file for complete search history.

(56) References Cited

U.S. PATENT DOCUMENTS

| 3,574,099 | A | 4/1971 | Ryals et al. ............... 252/8.5 |
| 4,579,668 | A | 4/1986 | Messenger ................ 507/118 |
| 5,826,669 | A | 10/1998 | Zaleski et al. ............ 175/72 |
| 6,581,701 | B2 | 6/2003 | Heying ..................... 175/72 |
| 7,229,492 | B2 | 6/2007 | Chatterji et al. .......... 106/724 |
| 2006/0096759 | A1 | 5/2006 | Reddy et al. .............. 166/295 |
| 2008/0113879 | A1 | 5/2008 | Way et al. ................. 507/117 |
| 2010/0152070 | A1 | 6/2010 | Ghassemzadeh .......... 507/212 |

FOREIGN PATENT DOCUMENTS

| RU | 2121560 | 11/1998 |
| WO | WO 2010/019535 | 2/2010 |

OTHER PUBLICATIONS

Lost Circulation Specialists, Inc., Magma Fiber General Information (2010) http://www.lostcirculation.com/.
Militky, Jiri et al., "Ultimate Mechanical Properties of Basalt Filaments," Text. Res. J., vol. 66, No. 4, pp. 225-229 (1996).
Singha, Kunal, "A Short Review on Basalt Fiber". Int'l J. of Textile Science, vol. 1, No. 4, pp. 19-28 (2012).

*Primary Examiner* — Zakiya W Bates
(74) *Attorney, Agent, or Firm* — John H. Runnels

(57) ABSTRACT

A method for reducing lost circulation in drilling wells employs composite materials containing an engineering thermoplastic polymer and mineral fibers. Optionally the composites may also include other components such as calcium carbonate and blending agents.

15 Claims, 2 Drawing Sheets

ENGINEERING PLASTIC / INORGANIC FIBER BLENDS AS LOST CIRCULATION MATERIALS

This is the United States national stage of international application PCT/US2013/022847, international filing date Jan. 24, 2013, which claims the benefit of the Feb. 2, 2012 filing date of U.S. provisional patent application Ser. No. 61/593,999 under 35 U.S.C. §119(e).

This invention was made with government support under grant number 68-3A75-6-508 awarded by the United States Department of Agriculture. The United States Government has certain rights in the invention.

TECHNICAL FIELD

This invention pertains to lost circulation materials, particularly to methods that employ lost circulation materials comprising engineering plastic and inorganic fiber blend composites.

BACKGROUND ART

Worldwide demand for energy continues to increase. The search for petroleum is reaching greater extremes for well depths, pressures, and temperatures. High-pressure, high-temperature (HPHT) drilling techniques are often used today. HPHT wells are often classified into three temperature categories: Tier I, up to 350° F. (177° C.); Tier II, up to 400° F. (204° C.); and Tier III, up to 500° F. (260° C.). Most HPHT wells also have high reservoir pressures, e.g., up to 20,000 psi (1379 bar) for Tier II wells. The elevated temperatures and pressures in these wells place demands on equipment selection, downhole pressure determination, lost circulation treatments, and the like.

Drilling fluids, often referred to as drilling muds in the petroleum industry, are often used in well-drilling operations. The drilling fluid, which may be a water-, oil-, or synthetic-based formulation, circulates within the well bore, carries cuttings to the surface, lubricates the drilling equipment, and acts as a cooling agent. So-called "lost circulation" occurs when drilling fluids or muds enter pores or fractures in a formation, and are then lost to the drilling operation instead of returning to the surface for recycling and reuse. Lost circulation is a significant industry problem. It is estimated that lost circulation costs the industry about $1 billion per year in the United States alone, and that lost circulation products could represent as much as an additional $250 million annually. (Comparable figures for lost circulation costs are not immediately available for other countries, but such costs are believed to be substantial worldwide.) Lost circulation can lead to failures in testing wells, and can also lead to decreased productivity.

A variety of "lost circulation materials" (LCM) have been employed to try to reduce levels of lost circulation. These "lost circulation materials" have included such things as coarse cellulosic fibers, fine cellulosic fibers, coarse nut shells, synthetic graphite, cellulose derivatives, mineral fibers, fine calcium carbonate (e.g., 1 mm in diameter), medium-sized calcium carbonate (e.g., 2 mm in diameter), and coarse calcium carbonate (e.g., 3 mm in diameter). Lost circulation materials often include different particle types and sizes to address different sizes of fracture. If part of the material is rigid but compressible or expandable under pressure, the material can perhaps mold itself into fractures to help seal leaks. Cellulosic fibers alone will often lack the needed rigidity, especially in HPHT wells. To compensate for the lower rigidity, a greater concentration of the material may be required to inhibit lost circulation effectively. Due to the low density of cellulose, cellulosic fibers are often pelletized when used as lost circulation materials to reduce transportation, storage, and handling costs. Cellulosic materials can also be vulnerable to degradation by decay, mold, and insects (e.g., termites) during storage. Inelastic materials such as waste plastics and rubber used in lost circulation materials typically do not have the swelling/expansion properties that are needed to adequately plug cracks and fissures. Resilient graphitic carbon (RGC) of various sizes has been used in lost circulation compositions for its resilience, but RGC can be expensive.

LCMs are often classified according to their physical nature and mechanism of action as being granular, lamellar, fibrous, or encapsulated. A granular LCM forms bridges both at the formation face, and within the formation matrix. The effectiveness of granular LCMs depends on their particle size distribution (PSD). Larger particles can first form a bridge across or within a void, and smaller particles can then bridge openings between the larger particles. A blend of large, medium, and small particles is therefore often used. Fibrous materials are best used for controlling losses in porous and highly permeable formations by forming a mat-like bridge over the pore openings. The mat reduces the size of the openings in the formation, permitting colloidal particles in the mud to rapidly deposit a filter cake. Flake (or lamellar) LCMs bridge voids and form a mat on the formation face, and are typically used for permeable and porous formations. A reactive LCM can be encapsulated within a chemical barrier to allow the material to be pumped through the drill pipe without reacting with the drill pipe itself. For example, lime can be encapsulated by an organic wax that has a melting point below the temperature of the underground formation, but above the maximum temperature of the drilling fluid that circulates within the borehole. The lime is not released and remains essentially unreactive while in the borehole. Once the lime reaches the underground formation, the wax melts and the lime becomes accessible for reaction. Blends of granular, flake, and fibrous LCMs have also been used, to supply varying particles size and material types for sealing different types of lost circulation zones. Combining different materials, however, usually tends to increase material handling costs.

How well a plug prevents fluid loss in a fracture depends upon both the mechanical strength of the plug and its permeability. The aspect of the plug responsible for mechanical strength is called the bridge, while the aspect that controls permeability is called the filter.

Conventional lost circulation materials have typically been made of one or more of the following materials: cellulose, cellulose derivatives, inorganic minerals, synthetic graphite carbon, rubber, thermoplastic polymers, and thermoset polymers. Products containing cellulose, cellulose derivatives, low-temperature melting rubber, and low-temperature melting thermoplastic polymers are generally limited to low-temperature uses. While other materials can be used at higher temperatures, such as synthetic graphite, they tend to be more expensive and to have a lower range of available particle sizes. Because of these limitations, material handling costs tend to be higher for higher-temperature LCMs in order to incorporate a range of material types and particle size categories.

Basalt, a common term used for a variety of volcanic rocks, originates from volcanic magma and flood volcanoes. Basalt forms when a very hot fluid or semifluid material originating under the earth's crust solidifies in open air. Plagiocene and pyroxene make up ~80% of many types of basalt. Basalt can also contain smaller amounts of silicon dioxide, magnesium oxide, and titanium dioxide; and trace elements such as Zr, Y, Nb, Fe, Ca, K, Na, Sc, Co, La, Ce, Sm, Eu, Yb, Hf, Ta, and Th. Compounds present in basalt may vary depending on the nature and origin of the basalt, especially the $SiO_2$ content. Basalt rocks can be classified by their $SiO_2$ content as alkaline basalts (up to about 42% $SiO_2$), mildly acid basalts (about 42-46% $SiO_2$), and acid basalts (about 46% or greater $SiO_2$). A preferred basalt for continuous, fine, high-strength fiber production is an acid basalt having a $SiO_2$ content of about 46% or greater. Rocks with lower $SiO_2$ content can still be made into fibers. The magma fibers we have used in prototype experiments have shorter lengths, and thus could be made from rock with lower $SiO_2$ content. A preferred basalt for fiber production has an approximately constant composition, the ability to melt without leaving substantial solid residue, an appropriate melt viscosity for fiber formation, and the ability to solidify to a glassy state without marked crystallization. Basalt fibers are typically manufactured by melting the rock, drawing or extruding the melt through a die, cooling, applying lubricant, and winding. Fibers are drawn from the melt under hydrostatic pressure and subsequently cooled to produce hardened filaments. A sizing liquid having components to impart strand integrity, lubrication, and resin compatibility is applied. Filaments are collected together to form a "strand," and a take-up device winds the filaments onto a forming tube. See generally Jiri Militky, Vladimir Kovacic; 'Ultimate Mechanical Properties of Basalt Filaments', Text. Res. J. 66(4), 225-229 (1996); Singha, K. "A Short Review on Basalt Fiber". International Journal of Textile Science 1(4): 19-28 (2012).

MAGMA™ fiber is a basalt fiber, sold by Lost Circulation Specialists, Inc. (Casper, Wyo.) as an additive for oil well drilling fluids. The major constituents of the Magma™ fiber, as reported by the manufacturer, are CaO 35.7%, MgO 9.6%, $Al_2O_3$ 9.3% and $SiO_2$ 42.3%. The material is thermally stable at temperatures up to about 1,800° F. It has a specific gravity of 2.6, and a solubility of 98.4% in a mixture of 60% hydrochloric acid and 40% acetic acid. MAGMA™ fibers have been used for controlling losses in porous and permeable formations by forming a mat-like bridge over the pore openings. However, small fiber-type LCMs such as MAGMA™ fibers tend not to form permanent bridges within a formation. Pipe movement and fluid movement within a wellbore can readily dislodge bridges over pore openings. MAGMA™ fibers have also been used in conjunction with cross-linked polymers such as polyacrylamides, as well as with water-insoluble polyvinyl alcohol to form mud/polymer/fiber systems for lost circulation control. See Lost Circulation Specialists, Inc. 2010. Magma fiber general information; U.S. Pat. No. 6,581,701; and US patent application publication number: 20100152070.

U.S. Patent Application publication no. 2006/0096759 discloses a lost circulation composition with a first portion of particles having a weight mean particle size of less than about 20 microns, a second portion of particles having a weight mean particle size in the range from about 25 microns to about 400 microns, and a third portion of particles having a weight mean particle size in the range of from about 450 microns to about 1,500 microns.

U.S. Pat. No. 7,229,492 discloses a well cement composition comprising a hydraulic cement, water, and inelastic lost circulation material particles made of granulated waste materials such as polyethylene, polystyrene, or polypropylene.

U.S. Pat. No. 3,574,099 discloses the use of nutshells and asbestos fibers as a lost circulation material.

U.S. Pat. No. 4,579,668 describes a two-component lost circulation material derived from discarded wet-cell battery casings. The first component is a thermoplastic polymer in a flexible, elongated form, and the second component is a granular thermoset plastic with a specific gravity in the range 1.2-1.4.

U.S. Pat. No. 5,826,669 discloses the use of resilient graphitic materials for fluid loss and lubrication purposes.

U.S. Patent Application publication no. 2008/0113879 discloses the use of plastic granules (e.g., polypropylene) as lost circulation additives in drilling fluid.

U.S. Pat. No. 6,581,701 B2 discloses the use of Magma™ fibers in conjunction with cross-linked polymers such as polyacrylamides for lost circulation control.

U.S. Patent Application No. 20100152070 discloses the use of Magma™ Fibers in combination with water-insoluble polyvinyl alcohol in an oil-based mud for lost circulation control.

There is a continuing, unfilled need for improved methods to control lost circulation in wells, especially methods that are adapted for use in high-pressure, high-temperature wells.

DISCLOSURE OF THE INVENTION

I have discovered a novel method for reducing lost circulation in drilling wells. The method is especially adapted for use in high-pressure, high-temperature wells. The method employs composite materials as lost circulation materials. The composite materials are economical, and they seal fissures and cracks more rapidly, more efficiently, and at higher temperatures and pressures than are typical of most commercially-available lost circulation materials.

The composites employed in the novel method comprise an engineering thermoplastic polymer and inorganic fibers, preferably fibers made from basalt. It is important that the polymer and fiber are combined into a composite material, and are not just a simple mixture. A "composite" is an engineered, solid-phase material made from two or more constituent materials having significantly different physical or chemical properties, in which the constituents remain separate and distinct on a macroscopic level within the finished, solid-phase structure. Optionally, the composites may also include additional components such as calcium carbonate (regular or precipitated), and blending agents to improve performance characteristics and material handling properties (e.g., rigidity, stability, or lubrication). The composite Engineering Plastic-Inorganic Fiber Blend (EPIFB) material can be made into pellets, flakes, granules, or particulate forms of various sizes (e.g., 10 to 5,000 microns) through extrusion, followed optionally by further grinding of the extruded materials. Different sized EPIFBs can be used to treat different fracture sizes in a formation. The Young's modulus and compression strength of the material can be controlled in a range up to at least about 11.50 GPa (1667.5 KPSI) and at least about 90 MPa (13,050 PSI), respectively. A high modulus allows the composites to deform progressively to accommodate the opening and closing of fractures, and a high strength allows the material/bridges to carry greater pressure. In a preferred embodiment the material comprises various particle size ranges, and is thermally stable up to at least about 500° F. (260° C.). The material can also be thermally stable at even higher temperatures, depending upon which engineering plastic(s) it contains. The composition may optionally be made using plastics having different melting temperatures to suit a variety of different formations. The composites have superior properties over the properties of a simple mixture. Use of a composite material allows one more readily to control the size distribution of the particles than one ordinarily can with mixtures of the individual components. In general the size distribution of particle mixtures is harder to control unless special efforts are taken with material handling (at increased expense).

The novel lost circulation materials are not merely mixtures of the several components. Rather, they are composites of the components. (Simple mixtures optionally may also be incorporated, in addition to the composites, although it is preferred to use composites alone.) The composites may be prepared through techniques that are otherwise known in the art for making composite materials. One such method is melt compounding, for example using intermesh, counter/co-rotating twin-screw extruders. The materials in the formulation are metered and fed to the extruder at an appropriate temperature. The extrudates are preferably quenched in a cold water bath or in air; and then they may be pelletized or ground into granules of suitable sizes. Another technique is to prepare a blend with a high-speed kinetic mixer (e.g., a mixer manufactured by LEX Technologies, Brampton, Ontario, Canada and supplied by EcoLEX, Inc., Burlington, Ontario), followed by grinding to produce desired particle sizes.

The thermoplastic matrix component of the lost circulation composite may comprise any virgin or recycled engineering polymer known in the art, including but not limited to, for example, one or more of the following polymers: polycarbonates (PC), polyamides (PA), polybutylene terephthalate (PBT), polyethylene terephthalate (PET), polyphenylene oxide (PPO), polyetherketone (PEK), polyetheretherketone (PEEK), polyimides, polyphenylene sulfide (PPS), copolymers of the above, and mixtures of these polymers and copolymers. The engineering plastic(s) provide a matrix in which the inorganic fibers and other optional components are embedded. For both economic and environmental reasons, it is generally preferred to use recycled plastics. The form of the material prior to making the composite is preferably a powder, pellet, or particulate. Recycled plastic materials can be ground using grinders known in the art to produce starting materials in a convenient size. The engineering thermoplastic may comprise from 10-70% of the total composite based on weight. The composition and proportions of the components making up the composite may be selected to impart the properties desired for a particular type of use or particular type of formation. Where more than one type of polymer is employed, they may be mixed as melts, or they may be co-extruded, or they may be components of a copolymer.

The inorganic component of the lost circulation composite may, for example, be selected from the group consisting of fibers or particles from basalt, glass, calcium carbonate, ceramics, and their respective composites. The inorganic fiber should have a high melting temperature, one that is substantially above the temperature of the formation(s) in which the material will be deployed. It should have high acid solubility, to make it easier to remove the bridge material after drilling with a mild acid. Optionally, but less preferred, the inorganic material can be in the form of particles other than fibers. Basalt fibers are preferred. The fibers supply rigidity, strength, and stiffness to the composite. The inorganic fibers may comprise from 10-70% of the total composite based on weight.

The composite may optionally comprise one or more additional components such as non-fibrous basalt, calcium carbonate, mica, talc, ceramics, and mixtures thereof, preferably in particulate form (although fibrous forms may also be used). The primary function of these additional components is to supply additional strength and stiffness to the composition. They can also help lower the cost of the composition. Further, these components can increase the density of the material so that the composition will settle more easily in water. Calcium carbonate is a preferred additive for these purposes. Calcium carbonate is available from many sources. An economical source of calcium carbonate is precipitated calcium carbonate (PCC) from sugar mills or sugar refineries. The PCCs of sugar origin, commonly known as lime scum or carbonate slurry, are inorganic precipitates resulting from the purification of beet juice or cane juice by liming and subsequent carbonatation. The PCCs of sugar origin typically have a powdery appearance with grayish hues. They readily agglomerate into lumps. PCCs are generated in enormous quantities as a byproduct of the sugar industry; currently PCC is used as a filling material for gravel mines, waste heaps, and the like; and in some cases it has been used for the correction of soils with excessively clay-like textures or to raise the soil pH. The PCC particle size typically varies from about 1 to about 3000 microns, although the size is not critical. The calcium carbonate or other mineral additive(s) may comprise from about 0% to about 30% of the total lost circulation material by weight.

The composite may optionally comprise one or more blending agents, such as silanes (compounds of silicon and hydrogen of the formula $Si_nH2_{n+2}$), other monomeric silicon compounds, or monoalkoxy titanates. The blending agents may comprise from 0% to about 5% of the total composition by weight.

Melt compounding is a preferred method to mix and prepare the ingredients of the composite, for example using an intermesh, counter-rotating/co-rotating twin-screw extruder. The preferred compounding temperature ranges from about 260° C. to about 330° C., depending primarily on the melting point of the plastic(s). The components (e.g., plastics, fibers, and additives) are metered and fed to the extruder. The extrudates are preferably quenched in a cold water bath or are air-cooled, and are then pelletized or ground into granules of the desired size(s).

The composition can be used together with other additives to form an oil-based, water-based, or synthetic oil-based drilling fluid. Other additives that may be used in the drilling fluid are such as those known in the art, including for example viscosifying agents, filtrate reducing agents, and weighting agents. The novel composites are preferably used in the drilling fluid at the concentration between about 2 PPB and about 50 PPB. (In this context, "PPB" means "pounds per barrel," not "parts per billion." The conversion factor to SI units is 1 PPB≈2.85 kg/m³.)

The aqueous fluid used to make a water-based drilling fluid may be fresh water, sea water, or brine; and it may optionally include water-soluble inorganic or organic compounds.

The natural or synthetic oil used to form an oil or synthetic oil-based fluid may, for example, be diesel oil, mineral oil, polydiorganosiloxanes, an ester-based oil, a used cooking oil, or mixtures thereof. It may optionally include oil-soluble inorganic or organic compounds.

The material may be used as a pretreatment to inhibit differential sticking, seepage, or both. It is preferred to add a concentration between about 2.0 PPB and about 6.0 PPB to the entire drilling fluid system. Sweeps at a concentration between about 5.0 PPB and about 15.0 PPB may be pumped to inhibit seepage while drilling through specific geological zones. The concentrations and volumes of the sweeps may be adjusted as needed. Hourly additions may be made or adjusted if seepage occurs. If lost circulation occurs, then the material may be added at a higher rate until losses stop, e.g., 20-35 PPB. (Note: 2 PPB≈5.7 g/L; 6 PPB≈17.2 g/L; etc.)

Optionally the method may be used to reduce the lost circulation of fluids other than drilling fluids, for example cement fluids during a cementing operation.

MODES FOR CARRYING OUT THE INVENTION

Example 1

Engineering Plastic-Inorganic Fiber Blend (EPIFB) Formulation

Five example engineering plastic-inorganic fiber blends (EPIFBs) are shown in Table 1. EPIFB 1 through EPIFB 5 were created using recycled polybutylene terephthalate (PET), fine basalt fibers (BF), and precipitated calcium carbonate (PCC) in a one-step extrusion process. During extrusion, the PET was fed upstream, and BFs were side-fed through a side-stuffer. For mixtures that included PCC, the PCC was tumble-mixed first, and the PCC was added along with the PET. The components were melt-blended and extruded in a co-rotating twin screw extruder (Micro 27—Leistritz Corporation, Allendale, N.J., USA) with a screw length/diameter ratio of 40:1. The extrusion temperature profile was 150, 190, 240, 240, 270, 270, 270, 250, 250, and 250° C. from the hopper to a strand die with two 3-mm strand openings, at a fixed 150 rpm screw rotating speed. The extrudate strands were drawn by a pelletizer, and cooled in a cold water bath before being pelletized.

TABLE 1

| Blend Name | Blend Composition BF/PET/PCC | Blend Density g/cm$^3$ | Bending Modulus GPa (PSI) | Bending Strength MPa (PSI) | Compression Strength MPa (PSI) |
| --- | --- | --- | --- | --- | --- |
| EPIFB 1 | 0/100/0 | 1.24 | 2.99 (434,000) | 64.00 (9280) | 69.78 (10,118) |
| EPIFB 2 | 40/60/0 | 1.77 | 7.06 (1,020,000) | 47.84 (6937) | 86.19 (12,497) |
| EPIFB 3 | 50/50/0 | 1.89 | 7.81 (1,130,000) | 45.38 (6580) | 89.55 (12,985) |
| EPIFB 4 | 75/25/0 | 2.05 | 11.3 (1,630,000) | 45.87 (6651) | 89.22 (12,937) |
| EPIFB 5 | 70/20/10 | 2.12 | 9.24 (1,340,000) | 22.20 (3218) | 82.12 (11,907) |

Example 2

Characterization of Basic Properties of EPIFBs

A portion of the extruded hot strands was collected on an aluminum plate immediately following extrusion. The material was hot-pressed to make two 4×4×0.2-inch thick plates (1 inch=2.54 cm), from which test samples were machined to measure blend properties. The blend density was determined by measuring size and weight of machined 1×1×0.2-inch samples. Flexural properties of the composite samples were measured according to ASTM D790-03 using an INSTRON 5582 Testing Machine (Instron Co., Grove City, Pa., USA). Compression strength at the 8% compression strain level was measured for each blend using the INSTRON 5582. TABLE 1 lists selected properties for various blends as shown. The tested blends had a density up to 2.12 g/cm$^3$, an elastic modulus up to 11.3 GPA (1,630,000 PSI), and a compression strength up to 89.55 MPa (12,985 PSI).

Figure 1A:
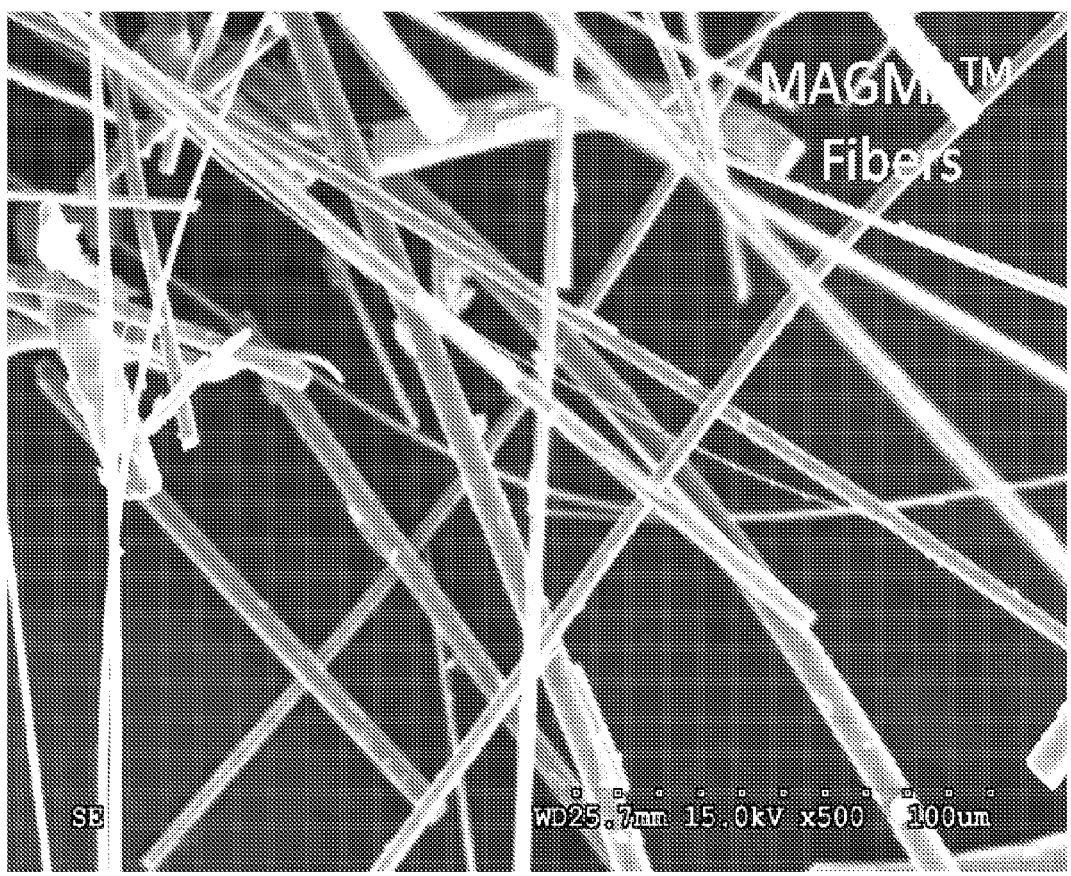
FIGS. 1(a) and 1(b) depict electron micrographs of original basalt fibers, and of a PET-basalt fiber blend, respectively.
Figure 1B:
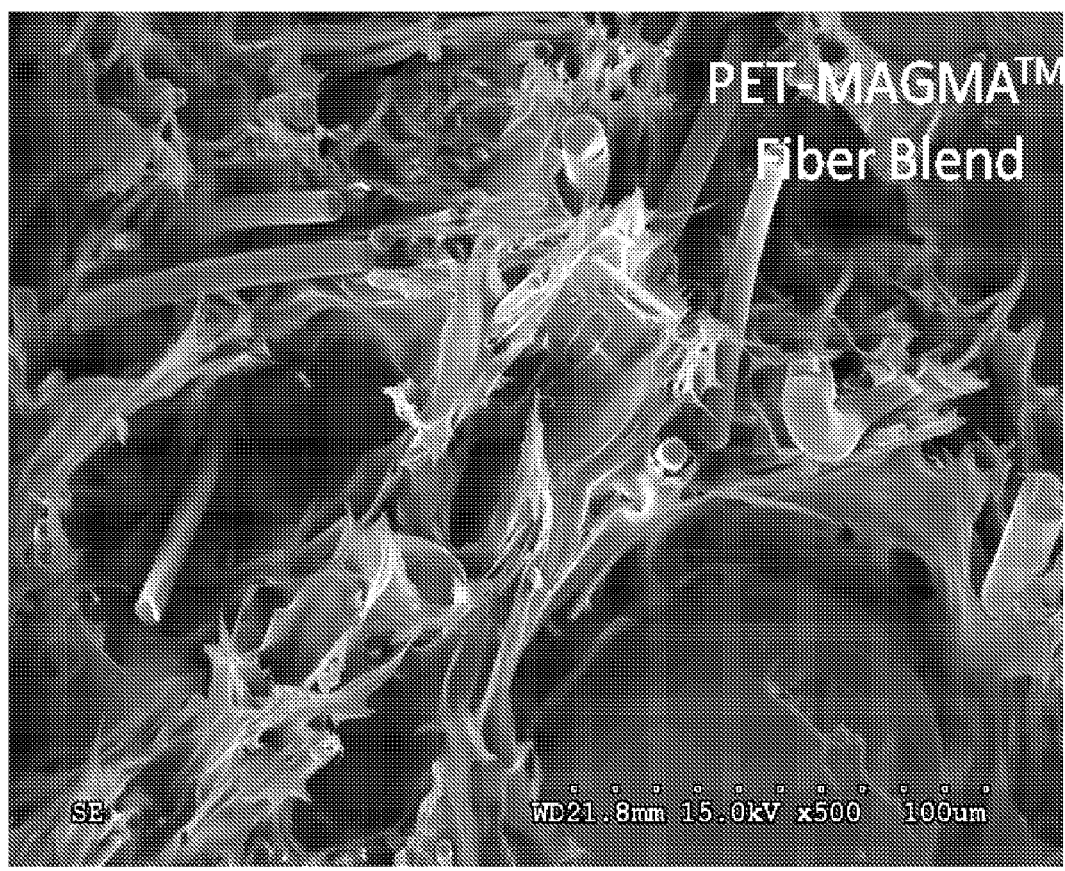

Composite morphologies were imaged with a Quanta 3D FEG Dual Beam Scanning Electron Microscope (SEM) with a focused ion beam (FIB) (FEI Company, Hillsboro, Oreg.). The samples were coated with Pt to improve surface conductivity before observation, and the samples were observed at an acceleration voltage of 5 kV. FIGS. 1(a) and (b) show typical electron micrographs, showing the original basalt fibers and PET-basalt fibers blends, respectively.

Thermal stability properties of the composite were measured using a TA Q-50 thermogravimetric analyzer (TA Instruments, New Castle, Del.). Samples were heated from 25° C. to 800° C. at a heating rate of 10° C./min under nitrogen flow. Weight loss percentage was determined. Table 2 shows measured onset temperature, degradation temperature, and maximum weight loss rate of various blends. The blends were all thermally stable to a temperature above 300° C.

TABLE 2

| Blend Name (Table 1) | Onset Temperature $T_0$ (° C.) | Degradation Temperature (° C.) | Maximum weight loss rate (percent per minute) |
| --- | --- | --- | --- |
| EPIFB 1 | 316.82 | 332.70 | 13.10 |
| EPIFB 2 | 324.39 | 344.35 | 14.31 |
| EPIFB 3 | 310.71 | 342.50 | 7.59 |
| EPIFB 4 | 323.07 | 345.71 | 9.82 |
| EPIFB 5 | 320.89 | 345.32 | 8.95 |

Example 3

Particle Size Distribution

Extruded EPIFB materials from EPIFB4 and EPIFB5 were granulated with a small industrial granulator using a USA standard 8-mesh screen. The material was then screened using USA standard testing sieves (4, 6, 8, 12, 16, 20, 40, 60, 100, and 200 mesh). The sieves were assembled with smaller mesh number screens (i.e., coarser sizes) on top. A sample of 400 g was screened each time. After screening, the material retained on each screen was collected and weighed to the nearest 0.01 gram using an analytical balance. The particle size distribution (PSD) was determined from the measured weight data. The PSD data for EPIFB4 and EPIFB5 are listed in Table 3.

TABLE 3

| Particle Size Category | | Particle Size Distribution Granulated with a 8-mesh Screen | | Particle Size Distribution Recombined with Different Particles | | |
| --- | --- | --- | --- | --- | --- | --- |
| Mesh | μm | PSD-EPIFB4 | PSD-EPIFB5 | PSD-S1 | PSD-S2 | PSD-S3 |
| 200 | 74 | 0 | 0 | 0.5 | 0 | 0 |
| 100 | 149 | 8.5 | 9.92 | 3.35 | 0.86 | 0 |
| 60 | 250 | 18.5 | 24.92 | 17.35 | 2.67 | 1.3 |
| 40 | 420 | 51.7 | 55.92 | 40.35 | 10.9 | 5.3 |

TABLE 3-continued

| Particle Size Category | | Particle Size Distribution Granulated with a 8-mesh Screen | | Particle Size Distribution Recombined with Different Particles | | |
|---|---|---|---|---|---|---|
| Mesh | μm | PSD-EPIFB4 | PSD-EPIFB5 | PSD-S1 | PSD-S2 | PSD-S3 |
| 20 | 840 | 80.7 | 80.62 | 70.6 | 36.03 | 18.55 |
| 16 | 1190 | 97.3 | 96.62 | 91 | 63.82 | 37.5 |
| 12 | 1680 | 99.4 | 99.62 | 100 | 84.92 | 62.5 |
| 8 | 2380 | 100 | 100 | 100 | 97.49 | 85.5 |
| 6 | 3360 | 100 | 100 | 100 | 100 | 100 |
| 4 | 4760 | 100 | 100 | 100 | 100 | 100 |

A preferred drilling fluid contains bridging solids having a PSD range that is tailored to deal with the natural heterogeneity encountered in a particular formation. Various guidelines have been used in the art to choose a PSD range to produce an efficient external filter cake that minimizes formation damage. For examples, the so-called Abram's Rule suggests that the median particle size of the bridging materials (by mass) should be equal to or slightly greater than one third of the median pore size of the formation. The so-called Hand's Rule suggests that the D90 (i.e., the diameter x such that 90% of the particles (by mass) have a diameter smaller than x) of the PSD for the LCM should be equal to the pore size of the formation. Different PSD ranges can be formulated to have any selected particle size range, following these or other guidelines, with screened EPIFB particles of different sizes. The rightmost three columns in TABLE 3 characterize three PSDs that were formulated with screened TIB4 materials to target mean crack sizes of 0.04, 0.08, and 0.12 inches (PSD-S1, PSD-S2, and PSD-S3, respectively). PSD-S2 and PSD-S3 were shifted to a distribution having larger particle sizes than PSD-S1. Additional PSDs can be formulated with other combinations of screened EPIFB particulates. Optionally, additional materials (e.g., calcium carbonate, graphite, etc.) can also be added to the EPIFBs when formulating PSDs for given geological formations.

Example 4

Water-Based Mud Application

A commercially-available, water-based mud was used to test EPIFB performance as a lost circulation material. The mud was formulated from water, caustic soda, sodium bentonite, lignite, polyanionic cellulose, and Rev Dust™ finely-ground altered calcium montmorillonite clay, for a 16.6 pounds per gallon (PPG) mud weight. (Note: 1 pound per gallon ≈0.120 kilogram per liter) Testing was conducted with a permeability plugging apparatus (PPA) in the following manner: (1) A 350-ml mud sample was taken from a large, well-mixed mud bucket. (2) A sample of an EPIFB LCM with a specific weight (e.g., 20, 15, 10, or 5 grams; equivalent to 20, 15, 10, or 5 PPB) was prepared by combining materials at different mesh sizes to produce a PSD as shown in TABLE 3 (e.g., PSD-S1). (3) The LCM preparation was blended into the 350-ml mud sample with a variable speed mixer for five minutes. (4) The mud with the LCM was then poured into the PPA cylinder, and an aluminum disc with a 0.04-inch wide by 2.0-inch long slot opening was inserted. (5) The PPA lid was then secured onto the PPA cylinder. 6) The PPA assembly was placed inside an insulated chamber with heating and temperature control systems, and attached to a hydraulic line. (7) A differential pressure of 500 PSI was applied with the top mud exit port closed. (1 PSI≈0.689 bar.) (8) After a 500 PSI pressure was reached, the exit port was opened and a timer was started, until a differential pressure of 1000 PSI was established. (9) The initial spurt loss was recorded when the pressure unit showed 1000 PSI. (10) A pressure of 1,000 PSI was maintained in the PPA for 30 minutes; and fluid loss at 7.5, 15, and 30 minutes was recorded. (11) After 30 minutes, the pressure was increased to the point at which the pressure broke the seal, and the maximum pressure before breaking was recorded.

TABLE 4 lists PPA test data using a 0.04-inch slot disc for two EPIFB preparations, and for G-SEAL™ graphite plugging agent for a comparison. In comparison with the G-SEAL™ material at the same loading level, the EPIFB materials showed enhanced sealing ability using the water-based mud.

TABLE 4

| Material Type | Loading per 350 ml mud (grams) | Spur Loss (ml) | Filtration Loss (ml) | | | Max. Breaking Pressure (PSI) |
|---|---|---|---|---|---|---|
| | | | 7.5 min. | 15 min. | 30 min. | |
| EPIFB4 | 20 | 15.0 | 20.0 | 22.0 | 22.0 | 1800 |
| EPIFB5 | 20 | 17.0 | 25.0 | 27.0 | 28.0 | 1700 |
| G-SEAL ™ | 20 | 60.5 | 70.5 | 70.5 | 72.5 | 1500 |

Example 5

Synthetic Mud Application

The novel LCM was also tested with a commercial synthetic mud. The commercial mud contained calcium chloride, alkenes, barium sulfate, crystalline silica, cristobalite, tridymite, and quartz. Basic mud properties were measured with a Baroid viscosity tester with a Fann thermo cup and a Fann 23D Electrical Stability Tester. The measured properties included the following: oil/water ratio=72/28; mud weight=13.3 PPG; plastic viscosity (PV) at 600 RPM/120° F.=98; plastic viscosity (PV) at 300 RPM/120° F.=56; PV/Yield Point=42/14; Gel strength at 120° F. (3 sec)=7; Gel strength at 120° F. (10 min)=16; and electrical stability=450 volts.

Electrical stability was measured using mixtures of 350 ml mud with 10 or 20 grams each of different EPIFB materials. TABLE 5 shows measured electrical stability data (i.e., mean values of 10 measurements, with standard deviations shown in parentheses). The data suggested that the EPIFB material had minimal effect on the electrical stability of the synthetic mud.

TABLE 5

| | System: | | | |
|---|---|---|---|---|
| | Mud (350 ml) | Mud (350 ml) + EPIFB4 (10 g) | Mud (350 ml) + EPIFB5 (10 g) | Mud (350 ml) + EPIFB4 (20 g) |
| Electrical Stability (volts): | 453.5 (10.8) | 437.7 (15.8) | 448.0 (16.0) | 422.0 (13.0) |

The synthetic mud was used to test the performance of the EPIFB lost circulation material using a permeability plugging apparatus (PPA) and an aluminum disc with a single 0.04-inch wide by 2.5-inch long slot, following the same procedures as otherwise described above for testing the water-based mud application. The EPIFB4 material and the G-SEAL™ material were separately tested at a 20-gram loading level in 350 ml mud. The PSD-S1 distribution (as shown in Table 3) was chosen for the EPIFB4 and EPIFB5 materials at each loading level.

TABLE 6 shows the experimental data. The EPIFB4 and EPIFB5 worked well with synthetic mud in controlling the filtration loss compared with G-SEAL™.

TABLE 6

| LCM Type | LCM Loading (grams) | Spur Loss (ml) | Filtration Loss (ml) | | | Max. Breaking Pressure (PSI) |
|---|---|---|---|---|---|---|
| | | | 7.5 min. | 15 min. | 30 min. | |
| EPIFB4 | 20 | 11.4 | 16.4 | 19.4 | 20.4 | 1900 |
| EPIFB5 | 20 | 15.6 | 17.6 | 20.6 | 23.6 | 1800 |
| G-SEAL ™ | 20 | 68.4 | 70.8 | 70.8 | 70.8 | 1500 |

TABLE 7 shows test data using a composite made of 70 wt % PET, 15 wt % basalt fiber, and 15 wt % calcium carbonate. A synthetic mud (mud weight=12.8 PPG) was used to test the performance of the material at 250° F. using a permeability plugging apparatus (PPA) and an aluminum disc with a single 0.04-inch wide by 2.5-inch long slot opening, following the procedures as otherwise described above for testing the water-based mud application. This composite had a lower overall density because of the higher level of PET materials. The formulation worked well with synthetic mud in controlling filtration loss, even at a relatively low loading level of 5 g composite/350 ml mud. Increasing the material loading level led to reduced mud loss.

TABLE 7

| PPT Filtration Property | Material Loading Level per 350 ml Mud | | | | |
|---|---|---|---|---|---|
| | Mud Only | 5 g | 10 g | 15 g | 30 g |
| Spurt Loss at 0 min (ml) | 150 | 16.4 | 14.4 | 6 | 5.6 |
| Loss at 7.5 Min (ml) | 340 | 16.4 | 14.4 | 6 | 5.6 |
| Loss at 15 Min (ml) | 340 | 16.4 | 14.4 | 6 | 5.6 |
| Loss at 30 Min (ml) | 340 | 17.4 | 14.4 | 6 | 5.6 |
| Maximum Pressure Maintained (PSI) | 0 | 2500 | 2500 | 2200 | 2200 |

The complete disclosures of all references cited in this specification are hereby incorporated by reference. Also incorporated by reference is the complete disclosure of the priority application, U.S. provisional application 61/593,999. In the event of an otherwise irreconcilable conflict, however, the present specification shall control.

What is claimed:

1. A method for reducing lost circulation of a fluid in a subterranean formation; said method comprising contacting the subterranean formation with a mixture of the fluid and a lost circulation material; wherein the lost circulation material comprises composite particles; wherein the composite particles comprise one or more engineering thermoplastic polymers, and one or more inorganic fibers; wherein the one or more engineering thermoplastic polymers are between about ten percent and about seventy percent of the lost circulation material by mass; wherein the one or more inorganic fibers are between about ten percent and about seventy percent of the lost circulation material by mass; and wherein the engineering thermoplastic polymer is a matrix that binds together the components of the lost circulation material into composite particles.

2. The method of claim 1, wherein the one or more engineering thermoplastic polymers are selected from the group consisting of polycarbonates, polyamides, polybutylene terephthalate, polyethylene terephthalate, polyphenylene oxide, polyetherketone, polyetheretherketone, polyimides, polyphenylene sulfide, and mixtures and copolymers thereof.

3. The method of claim 2, wherein the one or more engineering thermoplastic polymers comprise recycled commercial engineering plastic products.

4. The method of claim 1, wherein the one or more inorganic fibers are selected from the group consisting of basalt fibers, glass fibers, ceramic fibers, rock wool fibers, and mixtures thereof.

5. The method of claim 4, wherein the one or more inorganic fibers comprise basalt fibers.

6. The method of claim 1, wherein the composite particles additionally comprise one or more minerals.

7. The method of claim 6, wherein the one or more minerals are selected from the group consisting of calcium carbonate, mica, talc, ceramics, and mixtures thereof.

8. The method of claim 7, wherein the one or more minerals comprise precipitated calcium carbonate.

9. The method of claim 1, wherein the composite particles additionally comprise one or more blending agents.

10. The method of claim 9, wherein the blending agents are selected from the group consisting of silanes, other monomeric silicon compounds, and monoalkoxy titanates.

11. The method of claim 1, wherein the particle size distribution of the lost circulation material is selected to minimize the amount of lost circulation for the sizes of cracks and fissures characteristic of a chosen subterranean formation.

12. The method of claim 1, wherein the composite particles are admixed with one or more other thermally stable, lost circulation materials; wherein at least some of the other lost circulation materials do not comprise a composite material.

13. The method of claim 12, wherein the one or more other lost circulation materials are selected from the group consisting of basalt fibers, calcium carbonate, graphite, and thermoset polymers.

14. The method of claim 1, wherein the fluid comprises a drilling fluid; and wherein said method reduces losses of the drilling fluid.

15. The method of claim 1, wherein the fluid comprises a cement fluid injected into a subterranean formation during a cementing operation; and wherein said method reduces losses of the cement fluid, and thereby strengthens the cured cement.

* * * * *